Aug. 9, 1927. 1,638,422
J. WALKER
TUBE EXPANDER
Filed Aug. 28, 1922

J. Walker Inventor

By C.A. Snow & Co.
Attorney

Patented Aug. 9, 1927.

1,638,422

UNITED STATES PATENT OFFICE.

JAMES WALKER, OF ELIZABETH, NEW JERSEY, ASSIGNOR OF ONE-FOURTH TO PETER O. DONNELL, OF ELIZABETH, NEW JERSEY.

TUBE EXPANDER.

Application filed August 28, 1922. Serial No. 584,779.

This invention relates to tube expanders, the primary object of the invention being to provide an expander especially designed for heavy work.

Another object of the invention is to provide an expander of this character which may be readily moved in a tube, expanding balls being provided to reduce friction between the expander and tube in which the same is working.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
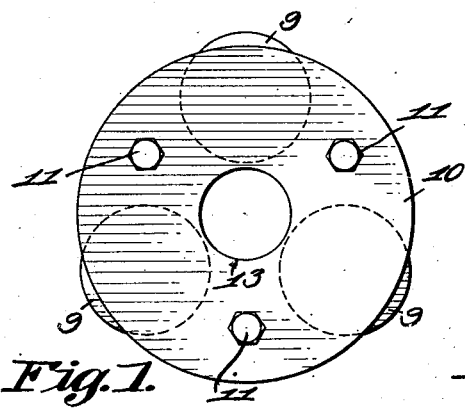
Figure 1 is a plan view of an expander constructed in accordance with the present invention.
Figure 2:
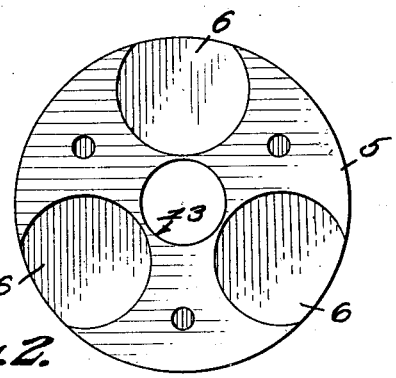
Fig. 2 is a plan view of the expander the securing plates thereof being removed.
Figure 3:
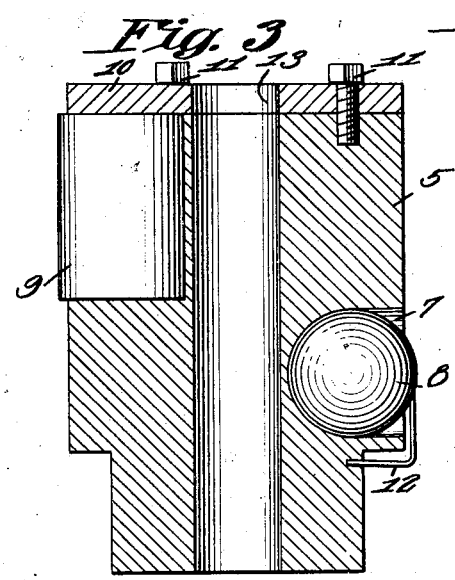
Fig. 3 is a longitudinal sectional view through the expander.
Figure 4:
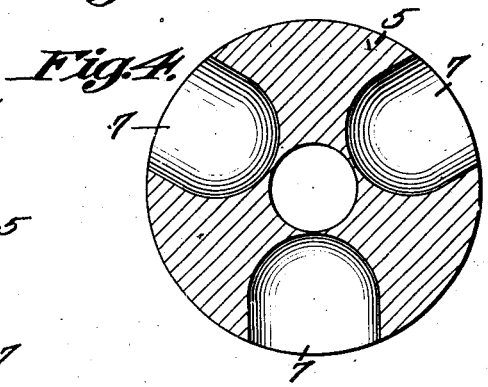
Fig. 4 is a transverse sectional view through the expander, the expanding rolls and balls being removed.
Figure 6:
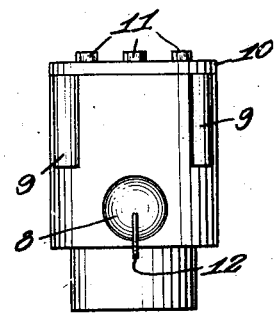
Fig. 6 is a side elevational view thereof.
Figure 5:
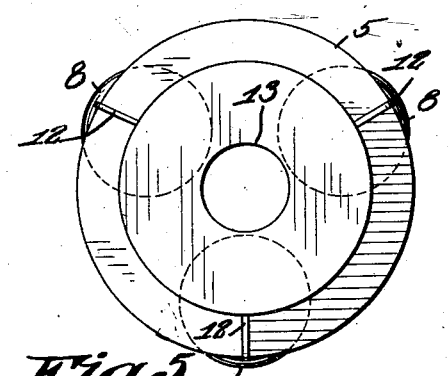
Fig. 5 is a bottom plan view of the expander.

Referring to the drawing in detail, the reference character 5 designates the body portion of the expander, which may be formed of suitable material, the same being shown as provided with openings 6 extending from one end thereof and terminating at points intermediate the ends of the body, as clearly shown by Fig. 3 of the drawing.

Disposed in proximity to the roller openings 6 are the ball openings 7, in which the balls 8 are positioned, the diameters of the balls 8 being greater than the depths of the openings to allow portions of the balls to extend beyond the periphery of the body portion 5, which is preferably circular in cross section.

Positioned in the opening 6 are rollers 9 which also have portions thereof extending beyond the periphery of the body 5 to contact with the pipe or tube under operation. The reference character 10 designates the securing plate which is secured to one end of the body portion 5 as by means of the bolts 11, the securing plate contacting with the outer ends of the rollers 9 to secure the rollers within their openings and insure against displacement.

The balls 8 are held within the openings 7, by means of the spring arms 12 which are shown as contacting with the balls, the tensions of the spring arms being such as to force the balls into engagement with the inner walls of their openings. The expander is formed with a central opening indicated at 13.

In the use of the device the body portion is forced into one end of the tube to be expanded, a slight rotary movement being imparted to the body portion 5 in any suitable manner. Due to the rollers and balls, it is obvious that the expanding operation may be accomplished with comparatively little exertion on the part of the operator.

What is claimed is:

In a tube expander, a body portion having elongated openings extending from one end thereof, the openings being circular in formation and having one of their respective walls cut away, rollers within the openings, a securing plate removably secured to one end of the body portion and contacting with the rollers to hold the rollers within the openings, said body portion having lateral openings, the lateral openings having cut away portions, balls positioned in the lateral openings, said balls being passed through the cut away portions, the inner surfaces of the lateral openings being curved, and means for holding balls within the lateral openings.

In testimony that I claim the foregoing as my own, I have hereto affixed my signature.

JAMES WALKER.